Patented Nov. 22, 1938

2,137,871

UNITED STATES PATENT OFFICE 2,137,871

DYE STAIN COMPOSITION

Julius F. T. Berliner, Wilmington, Del., assignor to E. I. du Pont de Nemours & Company, Wilmington, Del., a corporation of Delaware No Drawing. Application August 13, 1936, Serial No. 95,853

11 Claims. (Cl. 134—48)

This invention relates to stains and more particularly to solvents for dye stains utilized in staining wood and like materials in which relatively great penetration by the dye is desired.

One of the troublesome characteristics of the dye stains previously used, or more correctly of the solvents therefor, has been the grain raising of the wood attendant upon their use. Raising of the wood grain is particularly undesirable inasmuch as it requires sanding, and/or other operations for its removal. Numerous proposals have been made, therefore, in the past suggesting solvents for the dyes which would give the desired penetration of the dye but which would not have this undesirable grain-raising effect.

A further disadvantage of previously suggested dye stain solvents has been the fact that, even though such solvents, e. g., methanol, might be desirable from the absence of grain-raising standpoint, the difficultly soluble material present in or as the dye stain was not satisfactorily dissolved. In some instances it has been found that upon standing the difficultly soluble material even becomes flocculent, tends to swell, and gives considerable settling difficulty.

With a view toward overcoming these and other disadvantages of the prior art, it is an object of the present invention to provide an improved dye stain solvent.

It is a further object to provide a new and improved complete dye stain solution and method for its preparation.

Other objects and advantages of the invention will be apparent by reference to the following specification wherein its preferred details and embodiments are set forth.

According to this invention a new and improved dye stain solution or composition, most satisfactorily meeting all the requirements of an efficacious dye stain, is prepared by adding a dye suitable for use in wood staining to an alcohol, such as methanol, ethanol or the like which has previously had admixed therewith a relatively small quantity of urea. I have found that a dye stain solution composed of such ingredients gives decidedly better results in wood staining operations, showing unexpectedly improved solubility and color effect characteristics. The dye stain solution of this invention evaporates dry, leaves no observable residue, does not raise the grain of the wood and its penetration is superior to previously proposed dye solutions.

As a further feature of this invention, I have found that certain other materials, when added to urea-alcohol-dye solutions such as just described, give even more improved results. Thus, I have found various hydrocarbons, aliphatic and aromatic, such as xylene, benzene, gasoline, solvent naphtha and toluene may be added, although of these materials, toluene is preferred. Likewise additional efficiencies in solvent power of the urea-alcohol solutions for dyes may be obtained by adding, either in place of or together with the hydrocarbons enumerated, small quantities of one or more polyhydric alcohols, such, for example, as glycerine, glycols, such as ethylene and propylene glycol, and the like.

I have found a solution of dye, methyl alcohol, urea, toluene and glycerine to be the most efficacious although solutions of dye, alcohol, urea, toluene and ethylene glycol, or dye, alcohol, urea, toluene, and propylene glycol, or dye, alcohol, urea, toluene and mixtures of glycerine and glycols are highly desirable and superior to previously proposed dye stain compositions.

The proportions of material utilized according to this invention may be varied over a wide range although I have found that from about 2 to 5 ounces or an average of about 3 ounces of urea per gallon of alcohol or alcohol-toluene-glycerine or glycol solution gives the best results.

The alcohol-toluene-glycerine, or, for example, methanol-toluene-glycol solution is preferably composed of about 100 parts by volume of alcohol and up to about ten parts toluene and glycerine or glycol respectively altho the proportions may be varied over a fairly wide range without departing from the invention. Thus, for example, toluene and polyhydric alcohol in as small quantities as a fraction of a per cent respectively up to the 10% hereinbefore indicated (based upon the amount of methanol) or preferably an average of about 5% of the polyhydric alcohols and about 7½% of the toluene have been found to be feasible and to add improved characteristics to the solvent of this invention. For example, I have found the following specific composition, which is within the possible ranges hereinbefore indicated, to be particularly advantageous, i. e. a composition containing about 100 gallons of methanol, 2-10 gallons of polyhydric alcohol, specifically ethylene glycol or glycerine, and 14 pounds to 35 pounds of urea. To these solutions there is added, of course, the amount and type of dye requisite for the concentration and type of stain desired, i. e. sufficient dye to produce a saturated or substantially saturated dye stain solution such as commonly used in the art.

I have tested a great number and variety of the dyes used in wood staining in connection with the solvents of this invention, such, for example, as Orange RO, nigrosines, and the like, and have found them, without exception, to be dissolved to a much greater extent than in the case of other dye stain solvents. Thus, for example, methanol itself has previously been quite widely used as a dye stain solvent, but, in comparison with the solvent of the present invention it is less than one-fourth as effective both in dissolving dye and in its penetrative and freedom from grain-raising characteristics.

Various changes may be made in the details and methods of this invention without departing therefrom or sacrificing any of the advantages thereof.

I claim:

1. A dye stain composition comprising a solution of methanol and urea, substantially saturated with a staining dye, the urea being present in proportions of at least about 2 ozs. per gallon of methanol, sufficient to solubilize the dye in the methanol.

2. A dye stain solvent comprising a solution of methanol and urea, the urea being present in proportions of at least about 2 ozs. per gallon of methanol and sufficient to solubilize a dye stain in the methanol.

3. A dye stain composition comprising a solution of methanol and urea, substantially saturated with a staining dye, the urea being present in proportions of from about 2 to about 5 ozs. per gallon of methanol, and sufficient to solubilize the dye in the methanol.

4. A dye stain composition containing a staining dye, an aliphatic monohydric alcohol, a liquid hydrocarbon, a polyhydric alcohol and urea, the urea being present in proportions of at least about 2 ozs. per gallon of monohydric alcohol-liquid hydrocarbon-polyhydric alcohol solution, sufficient to solubilize the dye, and the liquid hydrocarbon and polyhydric alcohol each being present in the proportions of up to 10% by volume of the monohydric alcohol.

5. A dye stain solvent comprising an aliphatic monohydric alcohol, a liquid hydrocarbon, a polyhydric alcohol and urea, the urea being present in proportions of at least about 2 ozs. per gallon of monohydric alcohol-liquid hydrocarbon-polyhydric alcohol solution, sufficient to solubilize a dye in the monohydric alcohol, and the liquid hydrocarbon and polyhydric alcohol each being present in the proportions of up to 10% by volume of the monohydric alcohol.

6. A dye stain composition containing a staining dye, an aliphatic monohydric alcohol, a liquid hydrocarbon, a polyhydric alcohol and urea, the urea being present in proportions of from about 2 ozs. to 5 ozs. per gallon of monohydric alcohol-liquid hydrocarbon-polyhydric alcohol solution, sufficient to solubilize the dye, and the liquid hydrocarbon and polyhydric alcohol each being present in the proportions of up to 10% by volume of the monohydric alcohol.

7. A dye stain composition containing a staining dye, methanol, toluene, ethylene glycol and urea, the urea being present in proportions of at least about 2 ozs. per gallon of methanol-toluene-ethylene glycol solution, sufficient to solubilize the dye, and the toluene and ethylene glycol each being present in the proportions of up to 10% by volume of the methanol.

8. A dye stain composition containing a staining dye, methanol, toluene, ethylene glycol and urea, the urea being present in proportions of about 2 to 5 ozs. per gallon of methanol-toluene-ethylene glycol solution, sufficient to solubilize the dye, and the toluene and ethylene glycol each being present in the proportions of up to 10% by volume of the methanol.

9. A dye stain composition containing a staining dye, methanol, toluene, glycerine and urea, the urea being present in proportions of at least about 2 ozs. per gallon of methanol-toluene-glycerine solution, sufficient to solubilize the dye, and the toluene and glycerine each being present in the proportions of up to 10% by volume of the methanol.

10. A dye stain composition containing a staining dye, methanol, toluene, glycerine and urea, the urea being present in proportions of about 2 to 5 ozs. per gallon of methanol-toluene-glycerine solution, sufficient to solubilize the dye, and the toluene and glycerine each being present in the proportions of up to 10% by volume of the methanol.

11. A dye stain composition containing a staining dye, methanol, urea, toluene, and ethylene glycol in the proportions of about 100 gallons of methanol, 2–10 gallons ethylene glycol, and 14 lbs. to 35 lbs. urea.

JULIUS F. T. BERLINER.